UNITED STATES PATENT OFFICE.

JAMES L. WRAY, OF WATSEKA, ILLINOIS.

COMPOSITION FOR THE MANUFACTURE OF ARTIFICIAL STONE.

SPECIFICATION forming part of Letters Patent No. 312,057, dated February 10, 1885.

Application filed December 18, 1883. (No specimens.)

*To all whom it may concern:*

Be it known that I, JAMES L. WRAY, a citizen of the United States, residing at Watseka, in the county of Iroquois and State of Illinois, have invented a new and useful Composition of Matter to be Used in the Manufacture of Artificial Stone, of which the following is a specification.

This composition of matter consists of lime, alum, glue, and water combined with mortar.

In the preparation of this compound I add to forty gallons of water one-half peck of unslaked lime and five pounds each of alum and glue. A sufficient quantity of this compound is then added to ordinary mortar to bring the mass to a suitable consistency for use, when the artificial stone can be formed by spreading the mass to any desired thickness, as in laying pavements, or by molding it in blocks of any convenient form and size.

It will be understood that I do not confine myself to the precise proportions of ingredients above mentioned, as it is obvious that the quantities may be varied to some extent without affecting the usefulness of the compound for the purpose stated.

I am aware that lime, alum, and glue have heretofore been employed in compounds for artificial stone, together with other materials; but I am not aware that they have ever been used with common mortar, or that a composition consisting only of lime, alum, glue, and mortar has ever been used prior to my invention.

What I claim as my invention is—

The herein-described composition of matter to be used for the manufacture of artificial stone, the same consisting of water, lime, alum, glue, and common mortar, in about the proportions specified.

In testimony whereof I affix my signature in presence of two witnesses.

JAMES L. WRAY.

Witnesses:
GEO. C. HARRINGTON,
DAVID McGILL.